United States Patent
Kim et al.

(10) Patent No.: US 9,323,982 B2
(45) Date of Patent: Apr. 26, 2016

(54) DISPLAY APPARATUS FOR PERFORMING USER CERTIFICATION AND METHOD THEREOF

(71) Applicant: SAMSUNG ELECTRONICS CO., LTD., Suwon-si (KR)

(72) Inventors: Sang-yoon Kim, Yongin-si (KR); Ki-jun Jeong, Seoul (KR); Hee-seob Ryu, Hwaseong-si (KR); Mikiyas Teshome, Suwon-si (KR); Seung-kwon Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 56 days.

(21) Appl. No.: 14/093,888

(22) Filed: Dec. 2, 2013

(65) Prior Publication Data

US 2014/0294254 A1    Oct. 2, 2014

(30) Foreign Application Priority Data

Apr. 1, 2013  (KR) .................. 10-2013-0035414

(51) Int. Cl.
| | |
|---|---|
| *G06K 9/00* | (2006.01) |
| *G06F 21/32* | (2013.01) |
| *H04N 21/475* | (2011.01) |
| *H04N 21/4223* | (2011.01) |
| *H04N 21/4415* | (2011.01) |

(52) U.S. Cl.
CPC ............ *G06K 9/00288* (2013.01); *G06F 21/32* (2013.01); *G06K 9/00248* (2013.01); *H04N 21/4223* (2013.01); *H04N 21/4415* (2013.01); *H04N 21/4751* (2013.01); *G06F 2221/2149* (2013.01)

(58) Field of Classification Search
CPC ......... G06K 9/00288; G06K 9/00221; G06K 9/00248; H04L 63/0861; G06F 21/32; H04N 21/4415
USPC .................................... 382/118–127
See application file for complete search history.

(56) References Cited

U.S. PATENT DOCUMENTS

| | | | |
|---|---|---|---|
| 2005/0060740 A1 | 3/2005 | Stecyk | |
| 2007/0031010 A1 | 2/2007 | Sukegawa et al. | |
| 2011/0103694 A1 | 5/2011 | Nakano et al. | |
| 2012/0140982 A1 | 6/2012 | Sukegawa et al. | |
| 2013/0015946 A1* | 1/2013 | Lau et al. ................ | 340/5.2 |
| 2013/0051632 A1* | 2/2013 | Tsai et al. .................. | 382/118 |

OTHER PUBLICATIONS

Communication, dated Jul. 8, 2014, issued by the European Patent Office in counterpart Patent Application No. 14152520.4.

* cited by examiner

*Primary Examiner* — Manuchehr Rahmjoo
(74) *Attorney, Agent, or Firm* — Sughrue Mion, PLLC

(57) ABSTRACT

A method of certifying a user is provided. The method includes: generating a learning system; if a reference image is registered, analyzing the reference image by using the learning system to detect characteristic information; storing the detected characteristic information; photographing a user to acquire a user image; analyzing the user image by using the learning system to detect face characteristic information and additional information of the user; and comparing the face characteristic information and the additional information with stored characteristic information to certify the user. Therefore, a user certification is accurately performed.

17 Claims, 15 Drawing Sheets

FIG. 3

| USER | FACE CHARACTERISTIC INFORMATION |  |  |  |  |  |  |  | ... | ADDITIONAL INFORMATION |  |  |  |  |  |  | ... |
|---|---|---|---|---|---|---|---|---|---|---|---|---|---|---|---|---|---|
|  | SIZE | SHAPE | COLOR | EYE SIZE | EYEBROW DISTANCE | EYE POSITION | NOSE LENGTH | LIP'S TAIL'S ANGLE |  | HAIR STYLE | HAIR COLOR | CLOTHES COLOR | CLOTHES FORM | BEARD | EYEGLASSES | PIERCING | EAR RING |
| AAA | a1 | b1 | c1 | d1 | e1 | f1 | g1 | h1 | ... | aa1 | bb1 | cc1 | dd1 | ee1 | ff1 | gg1 | hh1 | ... |
| BBB | a2 | b2 | c2 | d2 | e2 | f2 | g2 | h2 | ... | aa2 | bb2 | cc2 | dd2 | ee2 | ff2 | gg2 | hh2 | ... |
| CCC | a3 | b3 | c3 | d3 | e3 | f3 | g3 | h3 | ... | aa3 | bb3 | cc3 | dd3 | ee3 | ff3 | gg3 | hh3 | ... |
| DDD | a4 | b4 | c4 | d4 | e4 | f4 | g4 | h4 | ... | aa4 | bb4 | cc4 | dd4 | ee4 | ff4 | gg4 | hh4 | ... |
| ... | ... | ... | ... | ... | ... | ... | ... | ... | ... | ... | ... | ... | ... | ... | ... | ... | ... | ... |

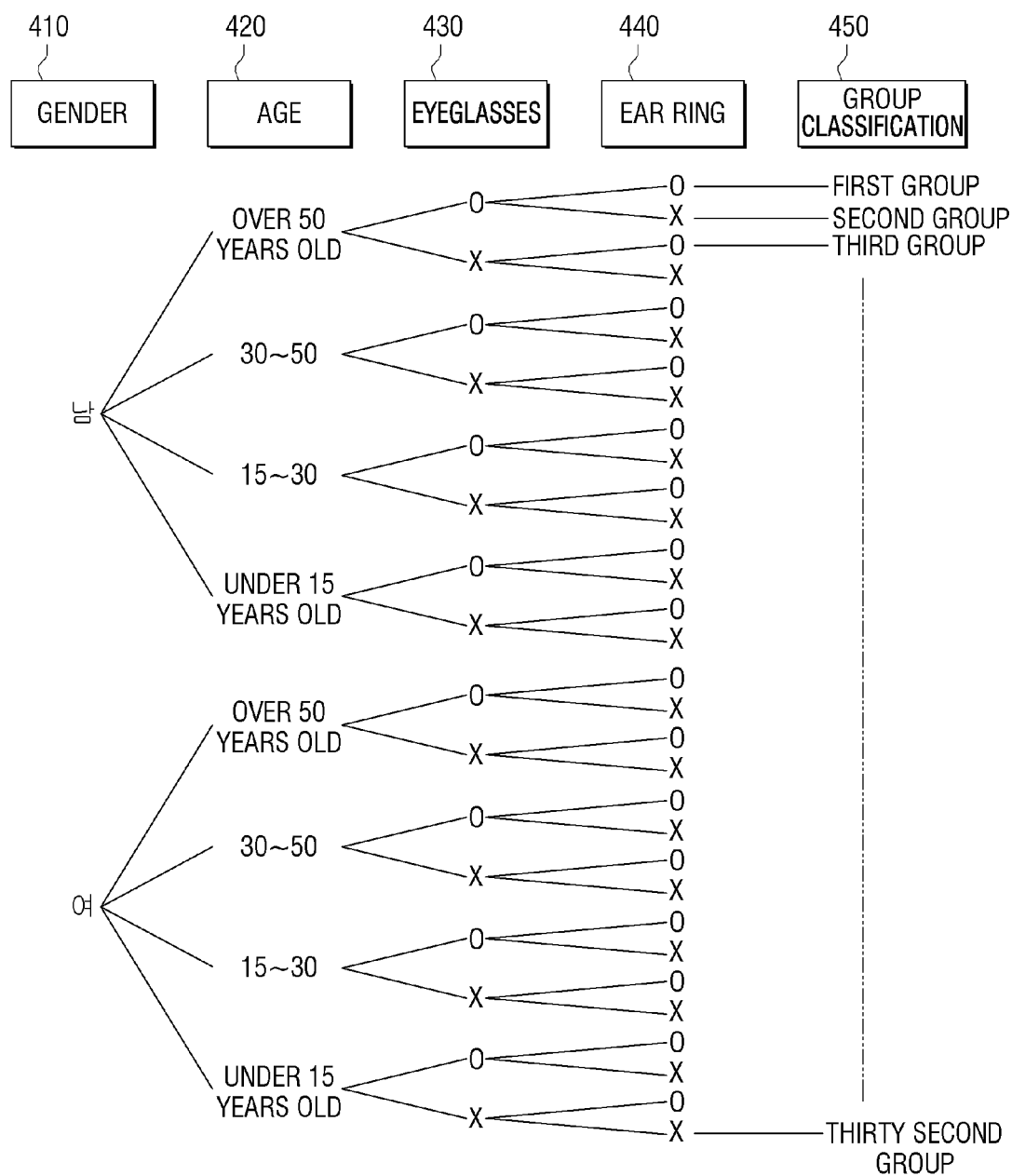

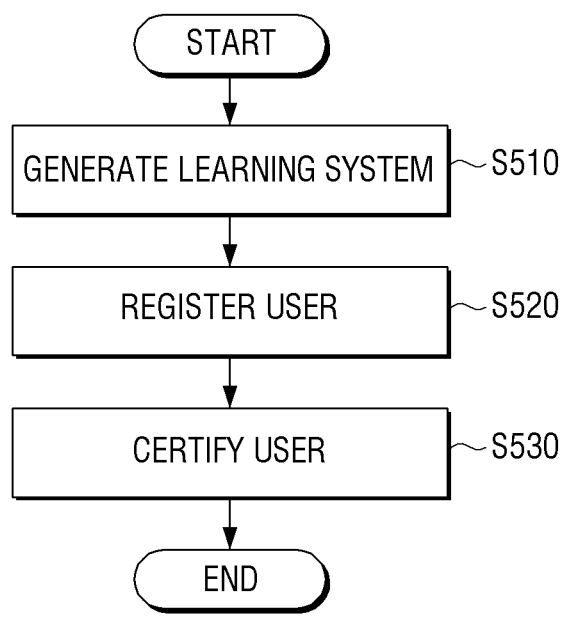

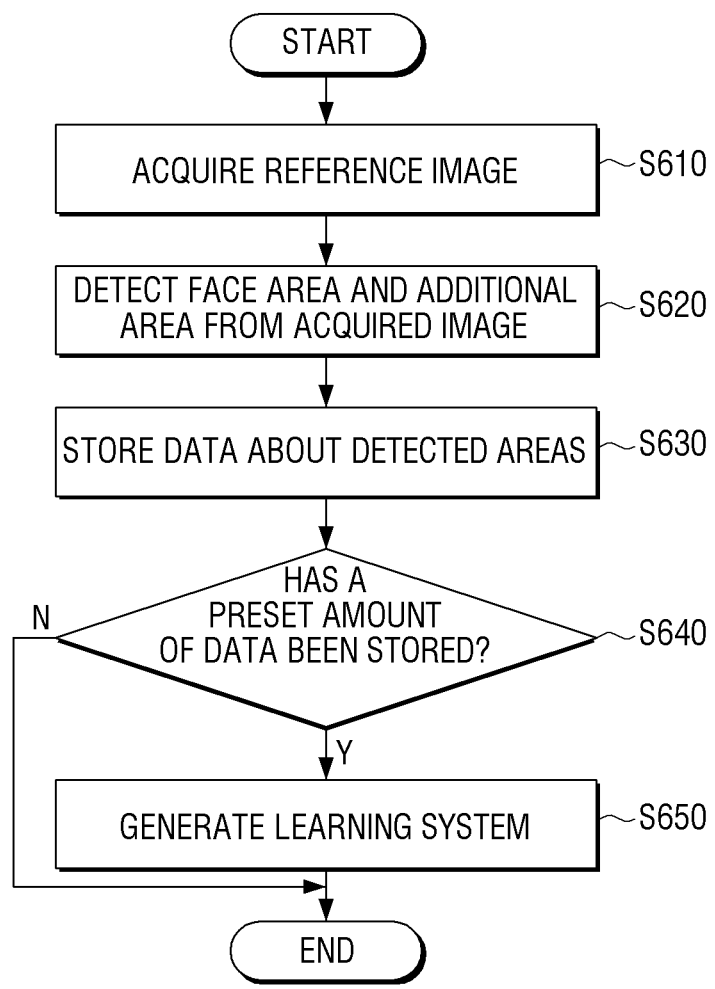

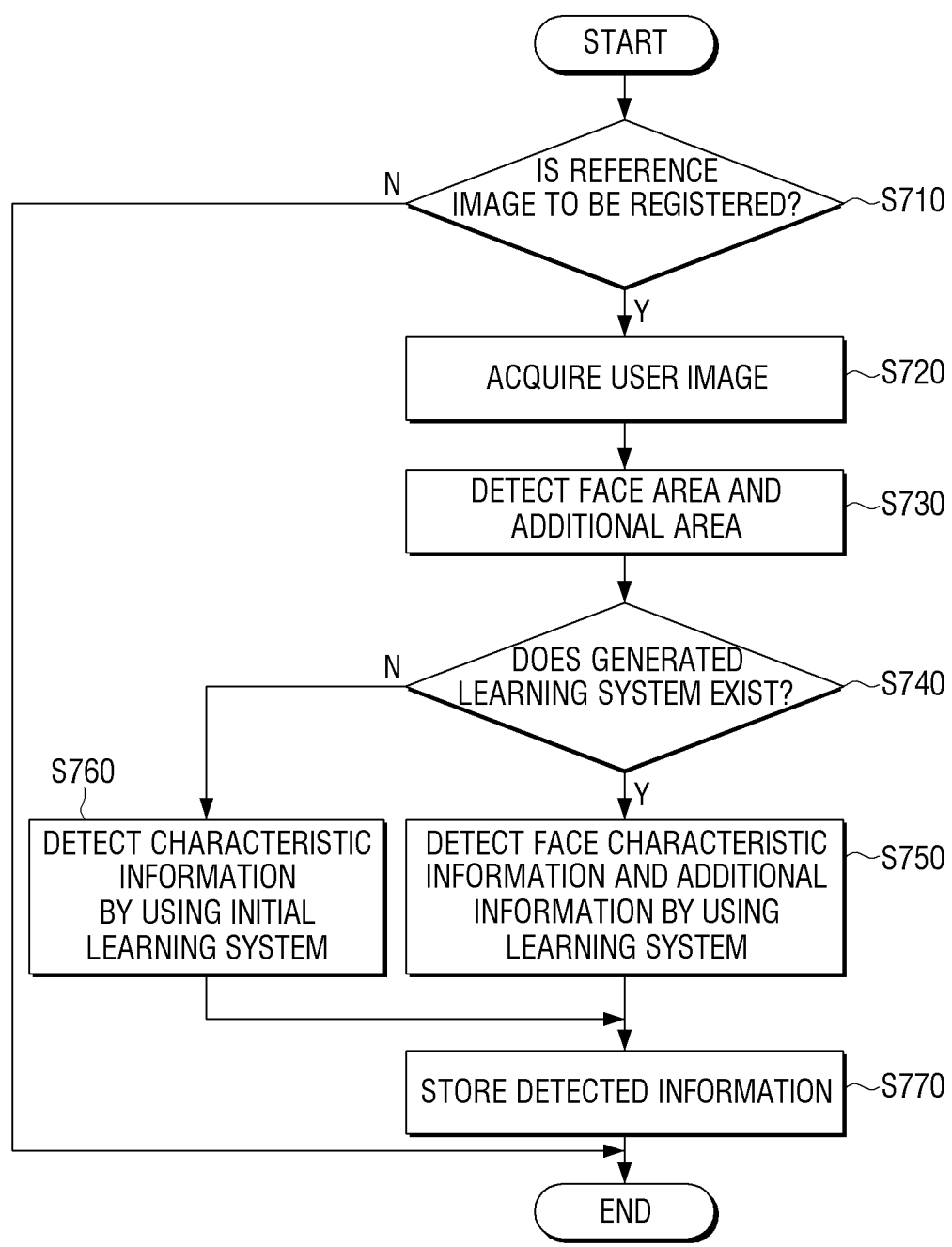

DISPLAY APPARATUS FOR PERFORMING USER CERTIFICATION AND METHOD THEREOF

CROSS-REFERENCE TO RELATED APPLICATION(S)

This application claims priority from Korean Patent Application No. 10-2013-0035414, filed on Apr. 1, 2013, in the Korean Intellectual property Office, the disclosure of which is incorporated herein by reference in its entirety.

BACKGROUND

1. Field

Apparatus and methods consistent with exemplary embodiments relate to providing a display apparatus for performing a user certification and a method thereof, and more particularly, to providing a display apparatus for performing a user certification by using face characteristic information of a user and additional information, and a method thereof.

2. Description of the Related Art

Various types of electronic products have been used with the development of electronic technologies. Additionally, the types of services provided by the electronic products have been diversified. Therefore, services may be limitedly provided according to identity of a user.

For example, if a plurality of users use an electronic product, such as a TV, a set-top box, or a digital versatile disk (DVD) player, minors may be limited to viewing only certain content. Therefore, a technology for performing a user certification to allow only a particular certified user to use certain services or view particular content is desired.

In the related art, a user certification is performed by using a password input method. However, according to this method, a user must remember the password. If the password is leaked, users who do not have use authorities may also be certified.

Accordingly, in the related art, research has been conducted to certify users by using a face recognition technology. However, it is difficult for the face recognition technology to accurately certify users. In particular, if users include family members or a twins, whose face similarity is typically higher than those of other unrelated people, an accuracy of a face recognition is lowered.

SUMMARY

One or more exemplary embodiments address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide a display apparatus for generating a learning system to perform a user certification and a method thereof.

According to an aspect of an exemplary embodiment, there is provided a method of certifying a user by using a learning system. The method may include: if a reference image is registered, analyzing the reference image by using the learning system to detect characteristic information; storing the detected characteristic information; photographing a user to acquire a user image; analyzing the user image by using the learning system to detect face characteristic information and additional information of the user; comparing the face characteristic information and the additional information with stored characteristic information; and certifying the user based on a result of the comparing.

The generating of the learning system may include: analyzing at least a preset number of reference images to detect face characteristic information and additional information of the reference images; and classifying and storing the face characteristic information and the additional information according to the detected characteristics.

The method may further include: if the user image is acquired when less than the preset number of reference images are registered, detecting characteristic information of the user image by using an initial learning system generated; comparing the detected characteristic information with stored characteristic information; and certifying the user based on a result of the comparing.

The characteristic information may include reference face characteristic information about a face of the user and reference additional information for identifying additional characteristics of the user other than the face of the user. The certifying of the user may include: searching pre-stored characteristic information for reference face characteristic information having a similarity to the face characteristic information of the user image that is greater than or equal to a first threshold value; if reference face characteristic information having a similarity to the face characteristic information of the user image that is greater than or equal to the first threshold value is found, certifying a person matching the searched reference face characteristic information as the same person as the user; if a plurality of pieces of reference face characteristic information are searched, comparing the additional information detected from the user image with reference additional information corresponding to the searched reference face characteristic information search for reference additional information having a similarity to the additional information detected from the user image that is greater than or equal to a second threshold value; and if reference additional information having a similarity to the additional information detected from the user image that is greater than or equal to the second threshold value is found, certifying a person matching the searched reference face characteristic information as the same person as the user.

The method may further include: if the certifying of the user fails, performing re-photographing; and re-certifying the user by using a re-photographed user image and the learning system.

The performing of the re-photographing may include: outputting a guide message for guiding a preset reference photographing posture; and if the user is in the reference photographing posture, performing the re-photographing.

The additional information may include information about at least one of a hair style, a hair color, a clothes color, a clothes form, a beard, eyeglasses, piercings, and ear rings of the user.

According to an aspect of another exemplary embodiment, there is provided a display apparatus including: a storage unit configured to store a learning system generated based on at least a preset number of reference images and characteristic information of a reference image analyzed by the learning system; an imaging unit configured to acquire a user image; and controller configured to analyze the user image using the learning system, detect face characteristic information and additional information of a user, and compare the face characteristic information and the additional information with the characteristic information to certify the user.

The controller may be further configured to analyze at least the preset number of reference images to detect face characteristic information and additional information of each of the reference images, classify the detected face characteristic information and the detected additional information according to the detected characteristics to generate the learning system, and store the generated learning system in the storage unit.

If a new reference image is registered, the controller may be further configured to analyze the new reference image by using the learning system to detect characteristic information of the new reference image and additionally store the detected characteristic information in the storage unit.

The storage unit may be further configured to additionally store an initial learning system. If the user image is acquired when at least the preset number of reference images are registered, the controller may be further configured to detect characteristic information of the user image using the initial learning system, and compare the detected characteristic information with stored characteristic information to certify the user.

The characteristic information may include reference face characteristic information about a face of the user in the reference image and reference additional information for identifying additional characteristics other than the face of the user in the reference image. The controller may be further configured to search the storage unit for reference face characteristic information having a similarity to the face characteristic information detected from the user image that is greater than or equal to a first threshold value to certify the user, and if a plurality of pieces of reference face characteristic information are searched, the controller may be configured to compare the additional information detected from the user image with reference additional information corresponding to the searched reference face characteristic information to search for reference additional information having a similarity to the additional information detected from the user image that is greater than or equal to a second threshold value in order to certify the user.

If the certification of the user fails, the controller may be further configured to re-certify the user by using a re-photographed user image and the learning system.

The display apparatus may further include: a display configured to output a guide message for guiding a preset reference photographing posture. If the user in the preset reference photographing posture, the controller may be further configured to control the imaging unit to perform the re-photographing.

The additional information may include information about at least one of a hair style, a hair color, a clothes color, a clothes form, a beard, eyeglasses, piercings, and ear rings of the user.

According to an aspect of another exemplary embodiment, there is provided a non-transitory computer-readable medium having recorded thereon a program, which, when executed by a processor, performs a method including: analyzing a reference image using a learning system to detect characteristic information; storing the detected characteristic information; acquiring a user image; analyzing the user image using the learning system to detect face characteristic information and additional information of the user; comparing the detected face characteristic information and the additional information with the stored characteristic information; and certifying the user based on a result of the comparing.

The method may further include generating the learning system, wherein the generating the learning system includes: analyzing at least a preset number of reference images to detect face characteristic information and additional information of the reference images; classifying and storing the detected face characteristic information and the detected additional information.

The method may further include detecting characteristic information of the user image by using an initial learning system, if the user image is acquired when less than the preset number of reference images have been analyzed; comparing the detected characteristic information with store characteristic information; and certifying the user based on a result of the comparing.

The characteristic information includes reference face characteristic information about a face of the user and reference additional information for identifying additional characteristics of the user other than the face of the user. The certifying the user includes: searching pre-stored characteristic information for reference face characteristic information having a similarity to the face characteristic information of the user image that is greater than or equal to a first threshold value; if reference face characteristic information having a similarity to the face characteristic information of the user image that is greater than or equal to the first threshold value is found, certifying a person matching the searched reference face characteristic information as the same person as the user; if a plurality of pieces of reference face characteristic information are searched, comparing the additional information detected from the user image with reference additional information corresponding to the searched reference face characteristic information to search for reference additional information having similarity to the additional information detected from the user image that is greater than or equal to a second threshold value; and if reference additional information having similarity to the additional information detected from the user image that is greater than or equal to the second threshold value is found, certifying a person matching the searched reference face characteristic information as the same person as the user.

The method may further include re-acquiring the user image, if the certification of the user fails; and re-certifying the user by using the re-acquired user image.

According to various exemplary embodiments as described above, a learning system may be generated to further accurately perform a user certification.

BRIEF DESCRIPTION OF THE DRAWINGS

The above and/or other aspects will be more apparent by describing certain exemplary embodiments with reference to the accompanying drawings, in which:

FIG. 3 is a table illustrating a database (DB) in which characteristic information detected from a registered user is recorded, according to an exemplary embodiment;

FIG. 4 is a view illustrating a structure of a learning system that uses face characteristic information and additional information detected from an image of a user, according to an exemplary embodiment;

FIG. 5 is a flowchart illustrating a method of certifying a user according to an exemplary embodiment;

FIG. 6 is a flowchart illustrating an operation of generating a learning system, according to an exemplary embodiment;

FIG. 7 is a flowchart illustrating an operation of registering a user, according to an exemplary embodiment;

DETAILED DESCRIPTION OF THE EXEMPLARY EMBODIMENTS

Figure 1:
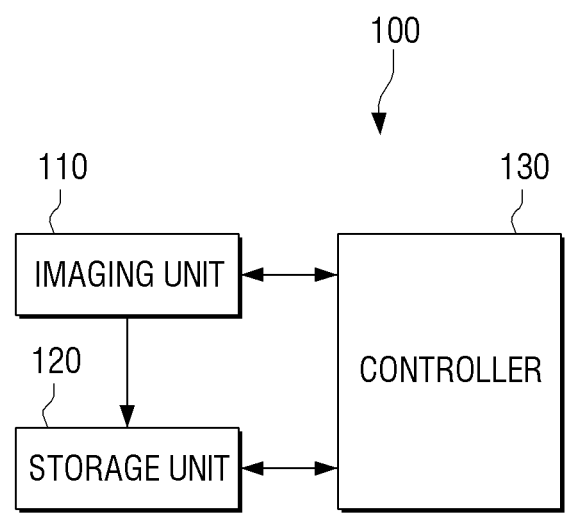
FIG. 1 is a block diagram illustrating a structure of a display apparatus according to an exemplary embodiment.

Certain exemplary embodiments are described in greater detail with reference to the accompanying drawings.

In the following description, the same drawing reference numerals are used for the same elements, even in different drawings. The matters defined in the description, such as detailed construction and elements, are provided to assist in a comprehensive understanding of the exemplary embodiments. However, the exemplary embodiments can be practiced without those specifically defined matters. Also, well-known functions or constructions are not described in detail since they would obscure the exemplary embodiments with unnecessary detail.

FIG. 1 is a block diagram illustrating a structure of a display apparatus 100 according to an exemplary embodiment. Referring to FIG. 1, the display apparatus 100 includes an imaging unit 110, a storage unit 120, and a controller 130.

The imaging unit 110 performs photographing to acquire an image of a user. The imaging unit 110 may include at least one camera. The at least one camera may be imbedded or attached to the display apparatus 100 or may be installed in a position remote from the display apparatus 100. If the at least one camera is installed in a position remote from the display apparatus 100, the at least one camera may transmit the image of the user to the display apparatus 100 through a wire or wireless interface. The at least one camera may be generally installed on a front side of the display apparatus 100 to photograph a face of the user watching the display apparatus 100. Image sensors, such as Complementary Metal Oxide Semiconductor (CMOS) image sensors and Charge-Coupled Device (CCD) image sensors, may be used for the at least one camera. The imaging unit 110 collects images of the user photographed by the at least one camera.

The storage unit 120 stores various types of programs, data, etc. necessary for driving the display apparatus 100. The storage unit 120 may include a hard disc drive (HDD), a flash memory, or the like.

The controller 130 controls an overall operation of the display apparatus 100. If the user registers a reference image, the controller 130 generates a learning system by using the reference image and stores the learning system in the storage unit 120. In further detail, if at least a preset number of reference images are registered, the controller 130 respectively analyzes the reference images to detect face characteristic information and additional information of the respective reference images and classify the face characteristic information and the additional information according to characteristics to generate the learning system.

The reference image refers to an image of the user that is used as a reference for comparing the reference image with images of the user photographed in a user certification process. The learning system refers to a learning program that learns to detect body characteristic information and additional information from an area in which a body or clothes of the user is displayed, classify users according to the detected information to generate a database (DB), and classify the users based on the generated DB. The learning system may be frequently or periodically updated with new data.

If characteristic information about at least the preset number of reference images is detected, the controller 130 may generate the learning system by using the characteristic information. The detected characteristic information and the learning system are stored in the storage unit 120.

If the user tries certifying, the controller 130 controls the imaging unit 110 to perform photographing. If the image of the user is acquired, the controller 130 analyzes the user image by using the stored learning system. The controller 130 detects face characteristic information and additional information of the user from the user image. The controller 130 compares the detected face characteristic information and additional information with the characteristic information stored in the storage unit 120 to perform a user certification. In further detail, if characteristic information corresponding to the detected information or having a higher similarity than a preset threshold value is found, the controller 130 determines that a user who has registered a reference image corresponding to the searched characteristic information has tried certifying, and further determines that a certification of the user has succeeded.

If the certification of the user has succeeded, the controller 130 may perform various types of subsequent operations. The subsequent operations may be variously determined according to a type or a function of the display apparatus 100, a user environment, a user setting value, etc. This will be described in further detail later.

Figure 2:
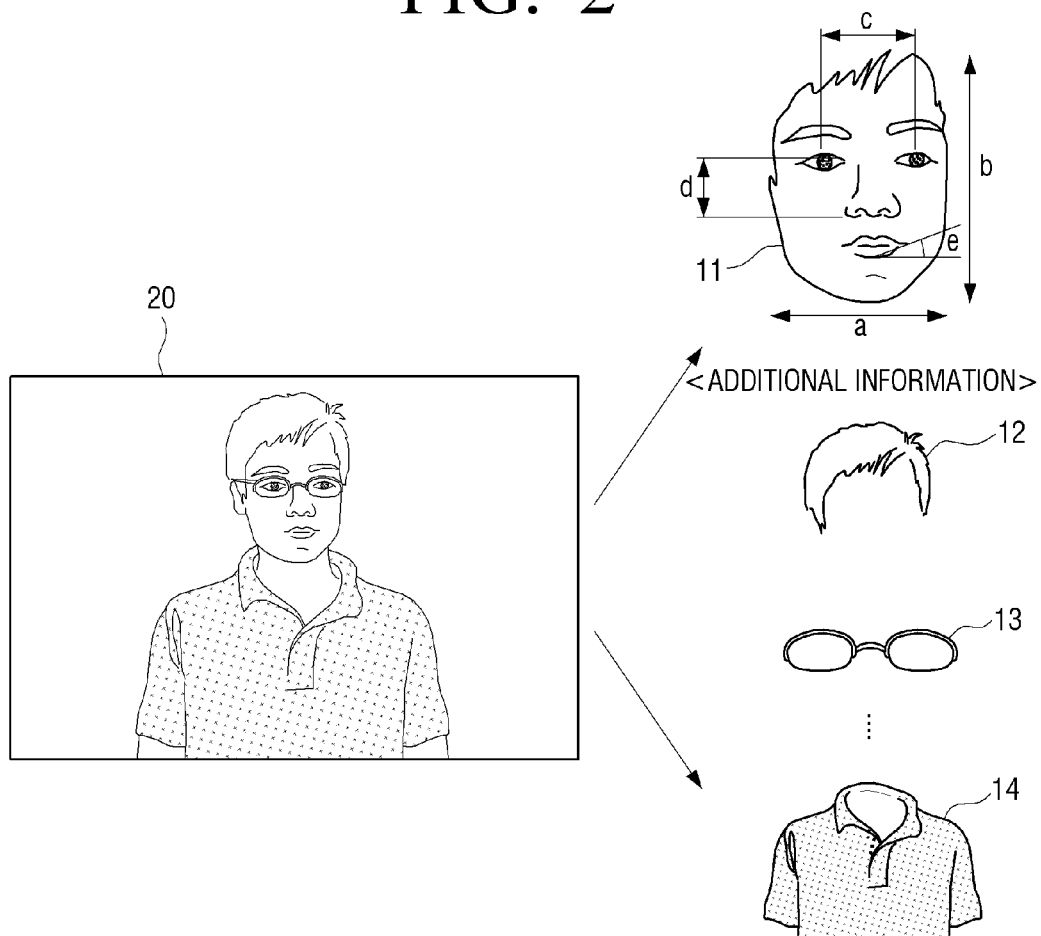
FIG. 2 is a view illustrating a method of analyzing an image of a user to detect face characteristic information and additional information, according to an exemplary embodiment.

FIG. 2 is a view illustrating a method of detecting face characteristic information and addition information by using a user image, according to an exemplary embodiment. Referring to FIG. 2, a face of a user and various additional areas other than the face of the user are displayed in a user image 20. For example, the additional areas may include an upper body, hair, etc.

The controller 130 may detect a face area and an addition area from the user image 20. The detection of the areas may be performed by using various types of well-known algorithms. For example, the controller 130 divides the user image 20 into a plurality of pixel blocks and calculates a representative pixel value of each of the pixel blocks. The representative pixel value may be calculated as an average value of all pixels of each of the pixel blocks, a maximum distribution value, an intermediate value, a maximum value, or the like. The controller 130 compares the representative pixel values of the pixel blocks to determine whether pixel blocks having representative pixel values belonging to a similar range are consecutively arranged. If the pixel blocks having the representative pixel values belonging to the similar range are consecutively arranged, the controller 130 determines that the pixel blocks form one object. Therefore, the controller 130 may divide the user image 20 into a surrounding background area and a user area.

The controller 130 determines whether there exist objects formed of pixel blocks having representative pixel values corresponding to a skin color of the user. If it is determined that there exist the objects formed of the pixel blocks having the representative pixel values corresponding to the skin color of the user, the controller 130 may determine that the objects correspond to a skin area. The controller 130 may determine whether the skin area is a face or another body part such as a hand, an arm, or the like, based on arrangements of pixel blocks corresponding to the skin area. The storage unit 120 may pre-store data about shapes of face areas determined based on a result of an experiment that is repeatedly pre-performed. The controller 130 may select pixel blocks corresponding to the face area based on the data stored in the storage unit 120. If the face area is selected, the controller 130 may regard the other area of the user area as an additional area. As a result, the controller 130 may detect the face area and the additional area from the user image 20.

The controller 130 applies the learning system to each of the face area and the additional area to detect the face characteristic information and the additional information. Face characteristic information, such as a face length (a), a face width (b), a distance (c) between eyes, a length of a nose bridge (d), an angle (e) of tails of lips, etc., is detected from a face area 11 in FIG. 2. However, various types of characteristic information, such as a shape, a size, and a color of a face, sizes, colors, and positions of eyes, angles of tails of the eyes, shapes of the eyes, a size of a nose, positions of ears, thicknesses of eyebrows, positions of the eyebrows, etc., may be detected. The controller 130 normalizes data detected from various parts of the face displayed in the face area 11 and detects face characteristic information about the various parts by using the normalized data and the learning system.

The controller 130 may detect additional information from additional areas 12, 13, and 14. Additional information about the hair area 12, the eyeglass area 13, and the clothes area 14 is detected in FIG. 2, but other various types of additional information may be detected. The controller 130 may detect information about a hair style of the user, a hair color, a color of the clothes, a form of the clothes, a position of beard, a shape of the beard, a color of the beard, eyeglasses, piercings, ear rings, etc., of the user.

The learning system may compare correlations between characteristic elements of the face area and the additional area to detect various types of information. Alternatively, the learning system may divide each of the face area and the additional area into a plurality of images in horizontal and vertical directions and apply a Principal Component Analysis (PCA) and a Linear Discriminant Analysis (LDA) to detect various types of information.

The controller 130 may normalize data about characteristics of the additional areas 12, 13, and 14 by using the learning system. For example, the controller 130 may classify shapes or colors of the hair area 12 according to preset standards and gives characteristic values corresponding to classified states to the shapes or the colors of the hair area 12. For example, if the hair area 12 is a bald head, a characteristic value may be given as 0. If a ratio of a size of the hair area 12 to a size of the face area 11 is less than a preset ratio, a characteristic value may be given as 1. If the ratio is higher than or equal to the preset ratio, a characteristic value may be given as 2. This classifying method is only exemplary, and thus the classifying method and numerical values thereof are not limited thereto.

The controller 130 stores the face characteristic information and the additional information detected by using the above-described method in the storage unit 120 to generate the DB. If a user who wants to use the display apparatus 100 registers a reference image, the controller 130 may analyze the reference image by using the above-described method to add the analysis result to the DB.

FIG. 3 is a table illustrating a structure of a DB, according to an exemplary embodiment. Referring to FIG. 3, the DB includes IDs AAA, BBB, CCC, DDD, . . . for identifying users, and face characteristic information and additional information respectively matching with the IDs.

The IDs may be arbitrarily generated and given by the controller 130 when the reference image is photographed or may be directly input by the user when the reference image is photographed. The face characteristic information may be classified into various items such as a face size, a face shape, a face color, an eyebrow distance, eyes' positions, a nose bridge length, lips' tails' angles, etc. The additional information may be classified into various items such as a hair style, a hair color, a clothes color, a clothes form, a beard, eyeglasses, piercings, ear rings, etc. Information a, b, c, d . . . written with respect to each item, may be calculated by the learning system. If there exists information about the beard, the eyeglasses, piercings, the ear rings, etc., the information may be recorded as 1. If there does not exist the information, the information may be recorded as 0. The structure and the items of the DB may be variously changed and is not limited to the structure illustrated in FIG. 3.

FIG. 4 is a view illustrating an operation of a learning system according to an exemplary embodiment. Referring to FIG. 4, the learning system classify information according various standards 410, 420, 430, and 440 into groups 450. The standards 410, 420, 430, and 440 include a gender, an age, eyeglasses, a beard, etc. but are not limited thereto. Various types of face characteristic information and addition information as described above may be standards.

Referring to FIG. 4, the controller 130 estimates a gender of a user by using a learning system. The gender of the user may be estimated by combining various types of information such as arrangements of a hair style, eyes, a nose, and a mouth, a face size, a face color, a beard, etc. The controller 130 may also estimate an age of the user based on wrinkles, a hair color, lips' tail's angles, eyes' tails' angles, whether the user wears eyeglasses, etc. Additional information, such as whether the user wears eyeglasses or ear rings, may be used as standards. The learning system may classify characteristic information about the user according to the standards to allocate the characteristic information into one of a plurality of groups. The learning system may generate a DB of each group and may match IDs of the DB with a group to store the IDs. If a user image is acquired, the learning system may search for characteristic information matching with the user image by using the method of FIG. 4. The controller 130 may compare the characteristic information of the user with the searched characteristic information to perform a user certification.

As described above, the display apparatus 100 generates a learning system based on images of users who use the display apparatus 100 and detects face characteristic information and additional information by using the learning system to perform a user certification. As a result, a more accurate face recognition may be performed with respect to users that look similar, e.g., brothers, sisters, parents, sons, or daughters.

FIG. 5 is a flowchart illustrating a method for a user certification according to an exemplary embodiment. Referring to FIG. 5, the display apparatus 100 generates a learning system, in operation S510. The display apparatus 100 may store the generated learning system to apply the generated learning system to a user image that is subsequently acquired.

In detail, a user who wants to use the display apparatus 100 may first register an image of the user. If a user registration is tried, the display apparatus 100 photographs a reference image of the user and registers the user by using the reference image in operation S520. The reference image may be analyzed by using the learning system, and a result of the analysis may be stored to register the user. Alternatively, the reference image acquired from photographing of the user may be stored in the display apparatus 100 to register the user.

If a certification of the user is tried in this state, the display apparatus 100 performs the certification of the user, in operation S530. Pre-stored characteristic information and the learning system may be used to perform the certification of the user. If the reference image is stored in the display apparatus 100 as described above, a pre-stored reference image may be analyzed to extract characteristic information, and the characteristic information may be compared with characteristic information of a user image that is newly photographed, in a user certification process.

Each operation of the method for the user certification described with reference to FIG. 5 may be variously realized according to exemplary embodiments. Hereinafter, detailed operation of the method will be described.

FIG. 6 is a flowchart illustrating a method of generating a learning system according to an exemplary embodiment. Referring to FIG. 6, in operation S610, a display apparatus photographs a user to acquire a reference image. In operation S620, the display apparatus detects a face area and an additional area from the acquired reference image. As described above, the additional area may be an upper body area.

In operation S630, the display apparatus stores data about the detected face area and the additional area. In operation S640, the display apparatus postpones generating of a learning system until a predetermined amount of data is stored. In other words, the learning system may basically recognize a face by using data acquired by using a plurality of face images. In operation S650, the display apparatus waits until a predetermined amount of data is secured before generating the learning system.

An amount of data may be variously determined according to a type, a user purpose, a use environment, etc. of the display apparatus. For example, if the display apparatus is used as a security system requiring a precise degree, the display apparatus may postpone generating of the learning system until a large amount of data is secured. If the display apparatus is used as a display apparatus that does not require a precise degree, e.g., a TV used in a general home, the display apparatus may generate the learning system after data about images of only a few of persons is secured.

As described above, the learning system refers to a program that is to analyze a user image to detect and manage face characteristic information and additional information. The display apparatus may provide basic, pre-installed learning program with data secured from the preset number of reference images to generate a learning system. In other words, the learning program learns that if pixel blocks having similar pixel values and similar shapes (for example, circular shapes) are displayed in similar positions of a plurality of images, the pixel values of the pixel blocks are face colors. If the preset number of pixels having surrounding pixel values and other pixel values are gathered in an object that is estimated as a face area, the learning program estimates that the pixels form eyes, eyebrows, a nose, a mouth, etc., that are characteristic parts of the face. Also, the learning program stores the pixel values to learn information about local characteristic elements of the face. The learning system may be generated by using this method.

FIG. 7 is a flowchart illustrating a method of registering a user according to an exemplary embodiment. Referring to FIG. 7, if an event occurs to register a reference image in operation S710, a display apparatus photographs a user to acquire a user image in operation S720. The event to register the reference may be variously determined according to exemplary embodiments. For example, the user may input a reference image registration command by using a button in a body of the display apparatus or a remote controller. Similarly, the reference image registration command may be input through other motions or a voice command. Alternatively, if the display apparatus is turned on without an additional command of the user, and a preset period of time passes, the display apparatus may determine that the event to register the reference image has occurred, even if the user requests a personalized service.

If the user image is acquired, in operation S720, the display apparatus detects a face area and an additional area from the user image, in operation S730. In operation S740, the display apparatus determines whether a generated learning system exists. If it is determined, in operation S740, that the generated learning system exists, the display apparatus analyzes the face area and the additional area detected from the user image by using the learning system to detect characteristic information, in operation S750. Here, the characteristic information may include face characteristic information and additional information. For convenience of description, characteristic information detected from a user face area is referred to as reference face characteristic information, and characteristic information detected from an addition area different from the face area is referred to as reference additional information. The reference additional information is used to identify additional characteristic appearing in parts different from the face area.

As described with reference to FIG. 6, if at least a preset amount of data is not secured, a learning system may not be generated. In operation S760, the display apparatus detects characteristic information by using an initial learning system that is initially provided. The initial learning system refers to a learning system that is generated by a manufacturer of the display apparatus by using face images of many unspecified persons and stored as default in the display apparatus. The display apparatus detects the characteristic information by using the initial learning system before the learning system is generated, in operation S760, and stores the detected characteristic information to register the user, in operation S770.

As described above, when a learning system is generated, the display apparatus analyzes a new reference image by using the learning system whenever the new reference image is registered to detect and store face characteristic information and additional information of the new reference image. The display apparatus may also newly update the learning system whenever a new reference image is registered.

Figure 8:
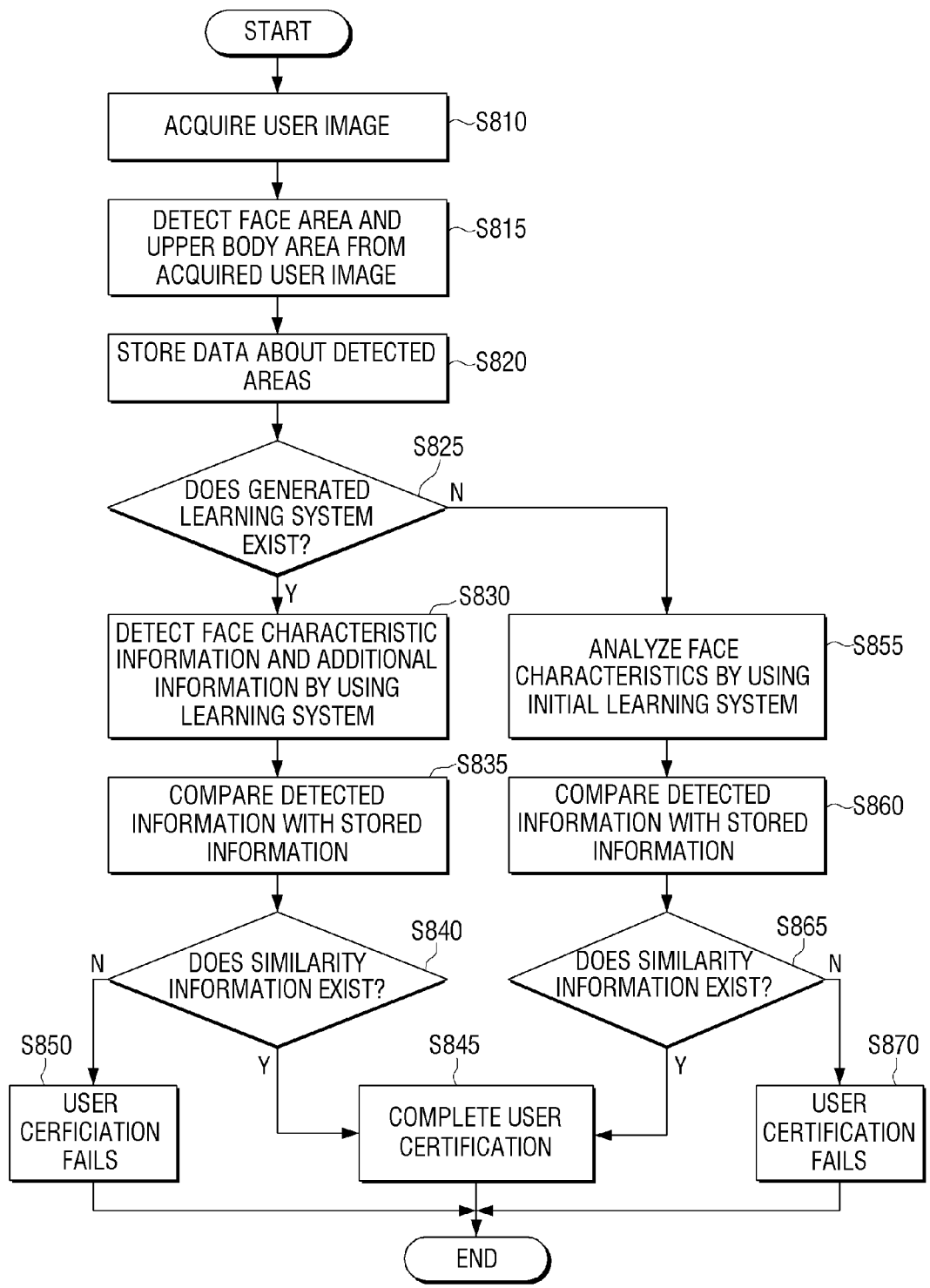
FIG. 8 is a flowchart illustrating operation of certifying a user, according to an exemplary embodiment.

FIG. 8 is a flowchart illustrating a user certification operation in detail according to an exemplary embodiment. Referring to FIG. 8, if a user certification is tried, a display apparatus photographs a user to acquire a user image, in operation S810. In operation S815, the display apparatus detects a face area and an additional area from the acquired user image. In operation S820, the display apparatus stores data about the detected face area and additional area.

In operation S825, the display apparatus determines whether a generated learning system exists. If it is determined, in operation S825, that the generated learning system exists, the display apparatus detects face characteristic information and additional information by using the learning system, in operation S830. In operation S835, the display apparatus compares the detected face characteristic information with pre-stored characteristic information. If similar information exists according to the comparison result, the display apparatus determines that the user certification has succeeded to complete the user certification, in operations S840 and S845. If the similar information does not exist according to the comparison result, the display apparatus determines that the user certification has failed, in operation S850.

A method of comparing detected information with stored information may be variously realized. For example, the controller 130 may search characteristic information stored in the storage unit 120 for reference face characteristic information having a similarly to face characteristic information detected from a user image that is greater than or equal to a first threshold value. Therefore, if one piece of reference face characteristic information is searched, the controller 130 may determine that a certification of a user matching with the reference face characteristic information has succeeded. If a plurality of pieces of reference face characteristic information are searched, the controller 130 compares reference additional information, corresponding to searched reference face characteristic information, with additional information, detected from the user image, to search for reference additional information having similarity to additional information that is greater than or equal to a second threshold value. The second threshold value may be set to a value that is lower than the first threshold value. For example, if the first threshold value is set to about 80%, the second threshold value may be set to about 50%. As described above, the controller 130 may certify a user in stages by sequentially using face characteristic information and additional information to improve a certification accuracy and minimize an operation burden.

As another example, the controller 130 may compare face characteristic information and additional information with reference face characteristic information and reference additional information stored in the storage unit 120 to determine whether a user has been registered. Accordingly, a certification speed may be improved.

If the generated learning system does not exist, in operation S825, the display apparatus analyzes face characteristics by using the initial learning system to detect characteristic information, in operation S855. In operation S860, the display apparatus compares the detected characteristic information with stored information. If similar information exists, in operation S865, the display apparatus determines that the user certification has succeeded to complete the user certification, in operation S845. If the similar information does not exist, in operation S865, the display apparatus determines that the user certification has failed, in operation S870.

If the user certification has failed, the display apparatus may display a message indicating that the user certification has failed or may retry the user certification. The display apparatus may perform re-photographing to retry the user certification.

The user certification may be performed in various situations. For example, the user certification may be performed when the display apparatus is turned on, when a channel that is restricted to watching is selected, when personal information is selected, when a web browser is executed, when a preset type of application is executed, etc.

Figure 9:
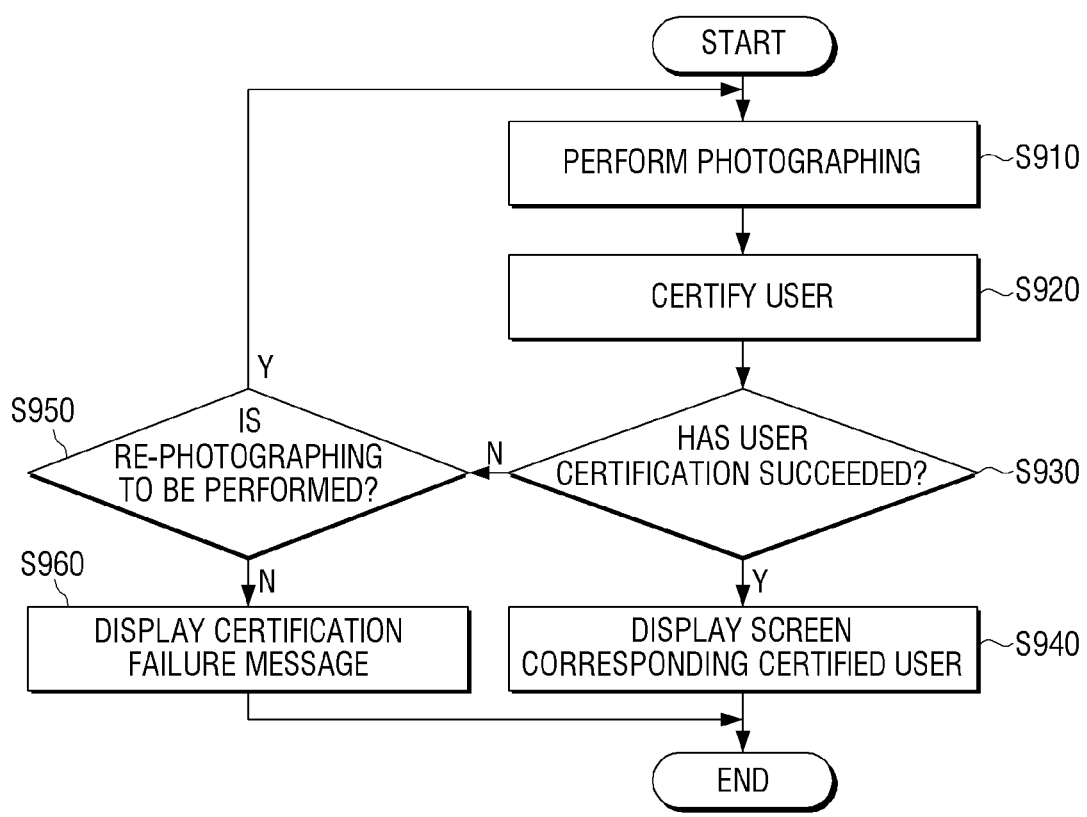
FIG. 9 is a flowchart illustrating a method of certifying a user, according to another exemplary embodiment.

FIG. 9 is a flowchart illustrating an operation of a display apparatus when a user certification has succeeded or failed, according to an exemplary embodiment. Referring to FIG. 9, the display apparatus photographs a user to acquire a user image, in operation S910. In operation S920, the display apparatus performs a user certification. The user certification has been described in detail above with reference to FIG. 8, and thus a repeated description thereof is omitted herein.

If the user certification has succeeded in operation S930, the display apparatus displays a screen corresponding to the user that has been certified, in operation S940. For example, the display apparatus may display a message to be shown to the certified user, information about a channel or a content selected by the certified user, a wallpaper, an application, etc.

If the user certification has failed, in operation S930, the display apparatus determines whether to perform re-photographing, in operation S950. The decision to perform the re-photographing may be manually determined by a user or may be automatically determined. If the re-photographing is determined to be performed, the display apparatus performs re-photographing and repeats the user certification by using the result of re-photographing. If re-photographing is not performed when the user certification has failed, the display apparatus displays a message indicating that the user certification has failed, in operation S960.

Figure 10:
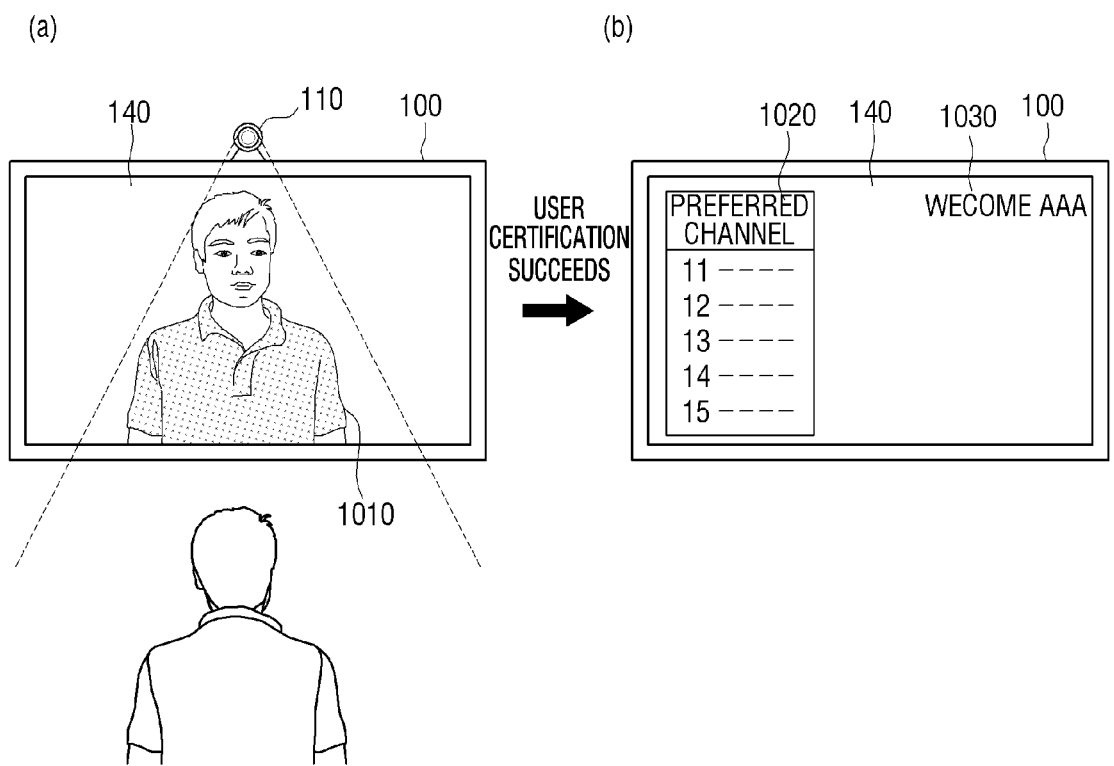
FIG. 10 is a view illustrating an operation of a display apparatus when a certification of a user succeeds, according to an exemplary embodiment.

FIG. 10 is a view illustrating a display screen when a user certification succeeds according to an exemplary embodiment. Referring to (a) of FIG. 10, a user image 1010, that is acquired by photographing a user, is displayed on a display 140. If a user certification succeeds based on the user image 1010, the controller 130 displays a personal information screen as shown in (b) of FIG. 10. Preferred channel information 1020, a text 1030 provided to a user, etc. may be displayed on the personal information screen in (b) of FIG. 10, but is not limited thereto.

Figure 11:
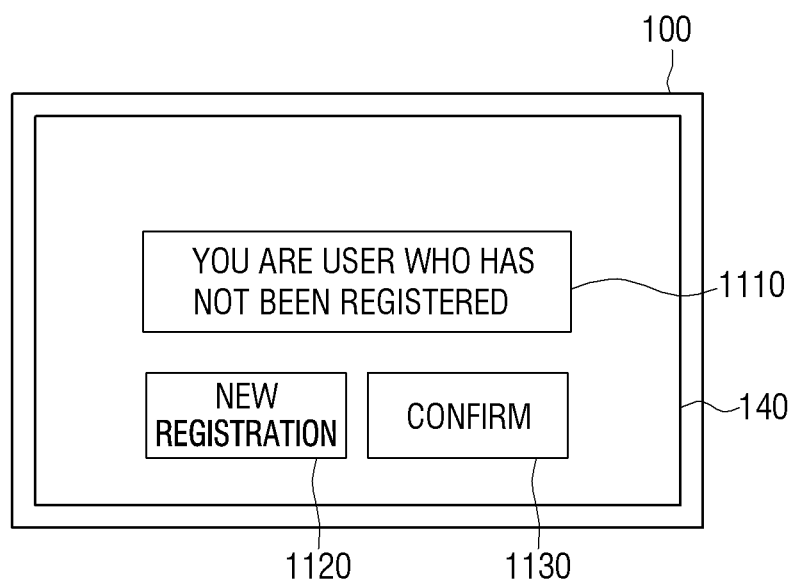
FIG. 11 is a view illustrating an operation of a display apparatus when a certification of a user fails, according to an exemplary embodiment.

FIG. 11 is a view illustrating a display screen when a user certification fails, according to an exemplary embodiment. Referring to FIG. 11, the controller 130 displays a certification fail message 1110, a new registration menu 1120, a confirm menu 1130, etc. through the display 140.

The new registration menu 1120 is used by a user to newly register a reference image. If the new registration menu 1120 is selected, the controller 130 photographs the user to perform a reference image registration process as described above. A process of inputting, though text, an age, a gender, a name, etc. of the user may be further included in this process.

If the confirm menu 1130 is selected, the controller 130 removes the certification fail message 1110 and re-displays a screen that has been displayed, on the display 140.

Figure 12:
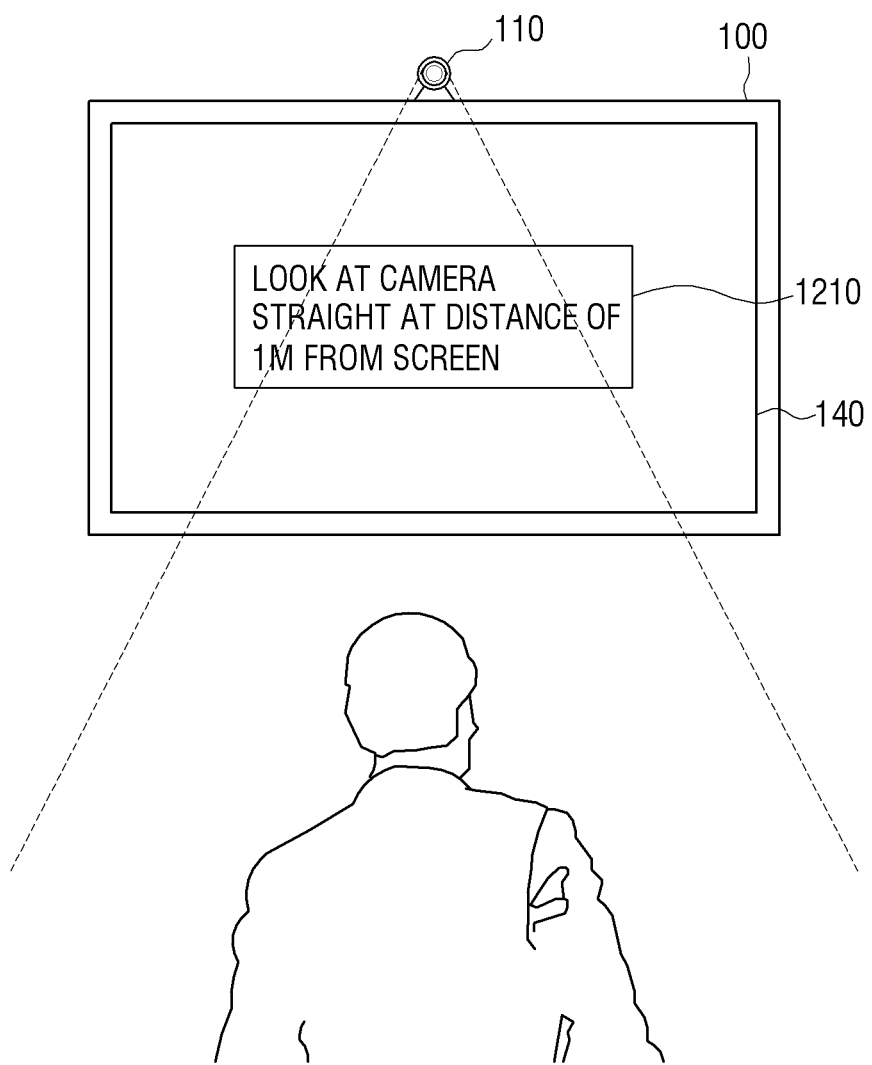
FIG. 12 is a view illustrating an operation of a display apparatus when a certification of a user fails, according to another exemplary embodiment.

FIG. 12 is a view illustrating a display screen when a user certification fails, according to another exemplary embodiment. Referring to FIG. 12, the controller 130 performs re-photographing if the user certification fails. In this process, the controller 130 outputs a guide message 1210, through the display 140, for guiding a user to take a preset reference photographing posture.

If the user takes the preset photographing posture, the controller 130 controls the imaging unit 110 to perform re-photographing. The reference photographing posture may be arbitrarily determined. For example, the reference photographing posture may be determined as a posture in which the user looks straight at the imaging unit 110 at a preset distance from the display apparatus. As illustrated in FIG. 12, the guide message 1210 may be displayed to guide the user to take such a posture, but does not need to be displayed as a visual message. Instead, the guide message 1210 may be output as a voice message through a speaker.

The re-photographing may be manually or automatically performed. If the re-photographing is designed to be manually performed, the user takes the reference photographing posture and inputs a photographing command by using a remote controller, or a body button, or a touch screen of the display apparatus to perform the re-photographing. If the re-photographing is automatically performed, the controller 130 may automatically perform photographing after a preset time (e.g., 5 seconds) passes from a time when the guide message 1210 is output. Alternatively, if it is determined that the user is in a preset position, by using an additional sensor, photographing may be automatically performed. If it is determined that the user keeps their eyes on the imaging unit 110 for at least a preset time, by using an eye tracking algorithm, photographing may be automatically performed.

The controller 130 re-certifies the user by using a re-photographed user image and a learning system.

The re-certification through re-photographing may be performed when a plurality of pieces of characteristic information that are similar to face characteristic information or additional information by at least a preset degree.

Figure 13:
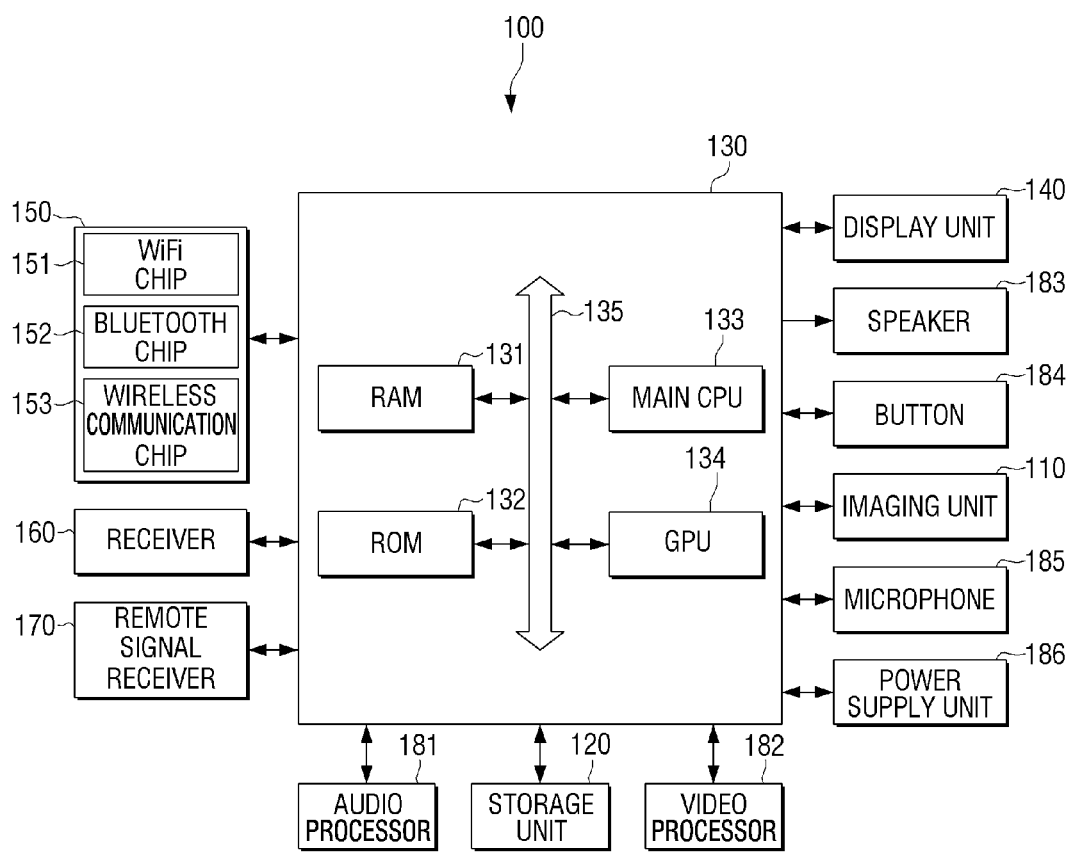
FIG. 13 is a block diagram illustrating a detailed structure of a display apparatus, according to an exemplary embodiment.

FIG. 13 is a block diagram illustrating a detailed structure of a display apparatus 100 that is realized as a TV, according to an exemplary embodiment. Referring to FIG. 13, the display apparatus 100 includes an imaging unit 110, a storage unit 120, a controller 130, a display 140, a communicator 150, a receiver 160, a remote signal receiver 170, an audio processor 181, a video processor 182, a speaker 183, a button 184, a microphone 185, and a power supply unit 186.

The controller 130 controls an overall operation of the display apparatus 100 by using a program stored in the storage unit 120. The display apparatus 100 may perform a learning system generating operation, a reference image registering operation, a user certifying operation, etc.

The controller 130 may include a random access memory (RAM) 131, a read only memory (ROM) 132, a main central processing unit (CPU) 133, a graphic processing unit (GPU) 134, a bus 135, etc. The RAM 131, the ROM 132, the main CPU 133, the GPU 134, etc. are connected to one another through the bus 135. Various types of interfaces may be further included, but their illustrations and descriptions are omitted.

The main CPU 133 accesses the storage 120 to perform booting by using an operating system (OS) stored in the storage unit 120. For example, a command set for booting a system is stored in the ROM 132. If a turn-on command is input to supply power, the main CPU 133 copies the OS stored in the storage unit 120 into the RAM 131, according to a command stored in the ROM 132, and executes the OS to boot the system. If booting is completed, the main CPU 133 copies various types of programs stored in the storage unit 120 into the RAM 131 and executes the programs copied into the RAM 131 to perform various operations. If there exists an application that is set to execute by default, the main CPU 133 may automatically execute the application when booting is completed. The GPU 134 may generate a wallpaper, an icon display screen, a broadcasting screen, and other screens under control of the main CPU 133. The GPU 134 may render on the screen, a personal guide message, personal information of the user, a message for indicating whether a user certification has succeeded or failed, etc., as described above.

The communicator 150 communicates with various types of external apparatuses according to various types of communication methods. The communicator 150 may include at least one of various wireless modules such as a WiFi chip 151, a Bluetooth chip 152, a wireless communication chip 153, etc. The wireless communication chip 153 performs communications according to various types of communication standards such as IEEE, Zigbee, 3rd Generation (3G), 3rd Generation Partnership Project (3GPP), Long Term Evolution (LTE), LTE-Advanced, etc. The communicator 150 may include one or more of the above-described various types of chips, or chips complying with communication standards, and communicate with the various types of external apparatuses by using the chips.

The receiver 160 selects and processes a broadcasting channel. The receiver 160 may include an antenna, a demodulator, an equalizer, etc.

The remote signal receiver 170 receives a remote signal from a remote controller and provides the remote signal to the controller 130.

The audio processor 181 processes audio data included in a content. The audio processor 181 may perform various types of processing, such as decoding, amplifying, noise filtering, etc., with respect to the audio data.

The video processor 182 processes video data included in the content. The video processor 182 may perform various types of image processing, such as decoding, scaling, noise filtering, a frame rate conversion, a resolution conversion, etc., with respect to the video data.

The audio processor 181 and the video processor 182 may be driven when a program for playing a content received from an external source or a content stored in the storage unit 120 is executed.

The display 140 displays various types of broadcasting screens, a user image, a message, etc., and the speaker 183 outputs various types of acoustic signals.

The button 184 may be provided on a body of the display apparatus 100 in various forms such as home button, a push button, a touch button, a wheel button, or the like.

The microphone 185 receives a user voice or other sounds and converts the user voice or the other sounds into audio data. The controller 130 may use the user voice input through the microphone 185 in a call process or convert the audio data and store the converted audio data in the storage unit 120. Alternatively, the controller 130 may register the user voice input through the microphone 185 along with a user image to use the user voice for a user certification. In other words, the controller 130 may analyze a tone of the user voice and store the analyzed tone as additional information. Therefore, if a user certification based on a user image fails as described above, the user certification may be performed by using a user voice.

FIG. 13 synthetically illustrates various types of installable elements if the display apparatus 100 is realized as a TV having a communication function. Therefore, according to exemplary embodiments, some of the elements of FIG. 13 may be omitted or changed, and other elements may be further added.

Figure 14:
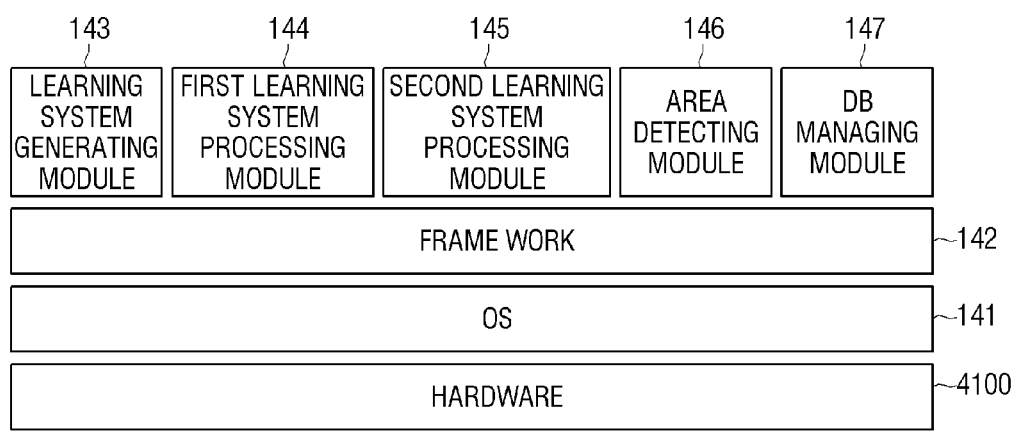
FIG. 14 is a view illustrating a software structure of a display apparatus, according to an exemplary embodiment.

FIG. 14 is a view illustrating a hierarchy of software that may be applied to a display apparatus, according to an exemplary embodiment. Referring to FIG. 14, the display apparatus 100 includes hardware 4100, an OS 141, a frame work 142, a learning system generating module 143, a first learning system processing module 144, a second learning system processing module 145, an area detecting module 146, and a DB managing module 147.

The hardware 4100 refers to various types of hardware shown in FIG. 13. The OS 141 controls and manages an overall operation of the hardware 4100. In other words, the OS 141 is a hierarchy that takes charge of a hardware management function and basic functions such as security, etc. The OS 141 may drive modules, such as a display driver for driving the display 140, a communication driver for activating the communicator 150 to transmit and receive a signal, a camera driver for driving the imaging unit 110, an audio driver for driving the audio processor 181, a power manager, etc., to control an operation of the display apparatus 100.

The frame work 142 exists as a higher layer than the OS 141. The frame work 142 connects the OS 141 to programs 143 through 147 of upper layers. The frame work 142 includes a location manager, a notification manager, and a frame buffer for displaying an image on a display.

An application layer exists as a higher layer than the frame work 142 to realize various functions. A learning system generating module 143, a first learning system processing module 144, a second learning system processing module 145, an area detecting module 146, and a DB managing module 147 exist in the application layer. The learning system generating module 143 is a learning program for generating a learning system by using a reference image. The first learning system processing module 144 is a program that applies the learning system generated by the learning system generating module 143 to a user image to detect face characteristic information and additional information from the user image. The second learning system processing module 145 is a program for detecting characteristic information by using a basic learning system generated as default. The area detecting module 146 is a program for detecting a face area and an additional area from the user image. The DB managing module 147 is a program that generates, updates, and manages a DB by using various types of characteristic information detected by the first or second learning system processing module 144 or 145. The DB managing module 147 may search the DB for reference characteristic information corresponding to information detected in a user certification process.

A user certification method as described above is not limited to a display apparatus and may be used in various fields.

Figure 15:
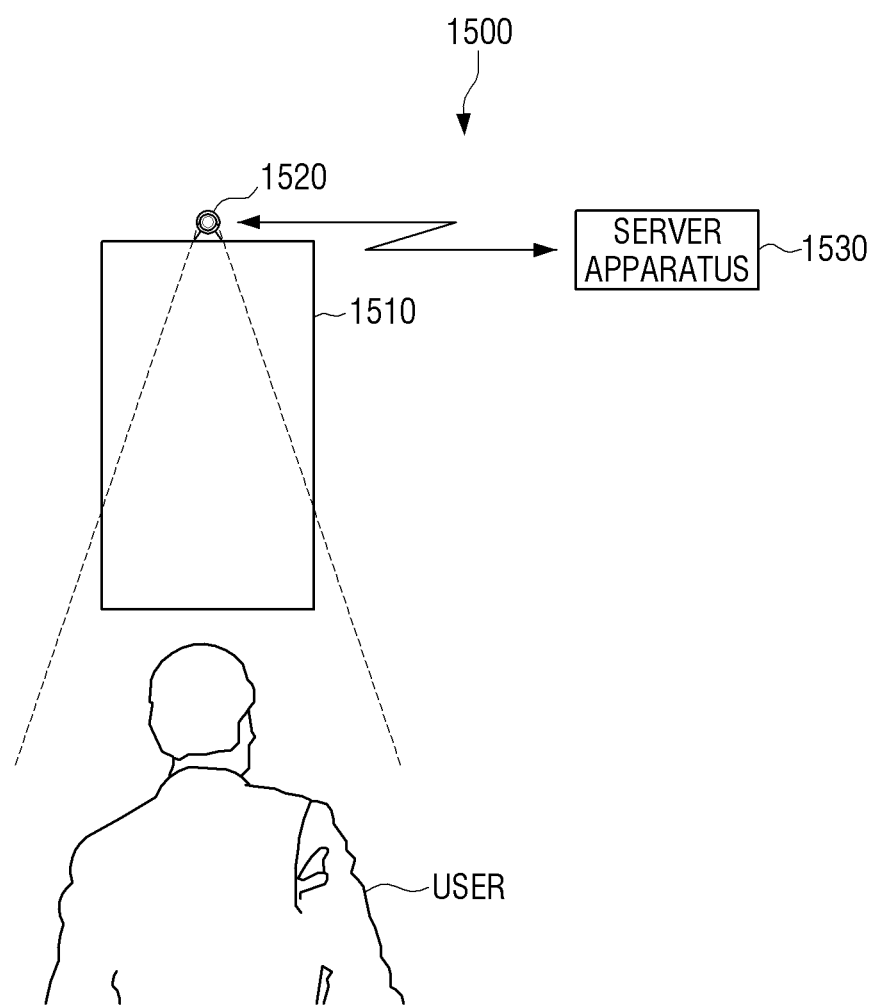
FIG. 15 is a view illustrating a user certification system that performs a user certification by using a face recognition technology, according to an exemplary embodiment.

FIG. 15 is a view illustrating a user certification system that performs a user certification to open and close a door, according to an exemplary embodiment. Referring to FIG. 15, the user certification system includes an automatic door 1510, a camera 1520, and a server apparatus 1530.

The automatic door 1510 automatically opens or closes a door under control of the server apparatus 1530. The automatic door 1510 may include a motor or the like for opening or closing the door, but detailed illustration and description thereof are omitted.

The camera 1520 is disposed on a side of the automatic door 1510 to photograph a user. A photographed user image is transmitted to the server apparatus 1530. The server apparatus 1530 compares the user image with stored reference characteristic information to perform a user certification. The server apparatus 1530 generates a learning system as described above and performs a user registration and the user certification by using the learning system. Therefore, the door may be opened only to a user who has been registered, and an entrance of a user that has not been registered may be restricted. The user certification system may be realized as various types of systems.

As described above, according to various exemplary embodiments, even in an environment in which a smaller number of users who look like one another exist, a user may be accurately certified by using various types of additional characteristics, such as face characteristics, clothes, eyeglasses, a hair style, etc. of the user.

A learning system generating method, a reference image registering method, a user certifying method, etc. according to the above-described various exemplary embodiments, may be coded as software and then stored on a non-transitory computer-readable medium. The non-transitory computer-readable medium may be installed and used in various types of apparatuses.

In further detail, a program code for performing the user certification method may be stored and provided on the non-transitory computer-readable medium. The user certification method includes: generating a learning system; if a reference image is registered, analyzing the reference image by using the learning system to detecting characteristic information; storing the detected characteristic information; photographing a user to acquire a user image; analyzing the user image by using the learning system to detect face characteristic information and additional information of the user; and comparing the face characteristic information and the additional information with stored characteristic information to certify the user.

The non-transitory computer-readable medium may refer to a medium that semi-permanently stores data and is readable by a device. The above-described applications or programs may be stored and provided on a non-transitory computer readable medium such as a CD, a DVD, a hard disk, a blue-ray disk, a universal serial bus (USB), a memory card, a ROM, or the like.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of certifying a user by using a learning system, the method comprising:
   in response to a reference image being registered, analyzing the reference image by using the learning system to detect characteristic information;
   storing the detected characteristic information as reference information;
   analyzing a user image, acquired by photographing a user, by using the learning system to detect face characteristic information and additional information of the user;
   comparing the face characteristic information of the user and the additional information of the user with the stored reference information, the reference information comprising reference face characteristic information about the face of the user and reference additional information for identifying additional characteristics of the user other than the face of the user; and
   certifying the user based on a result of the comparing,
   wherein the certifying the user comprises:
      in response to reference face characteristic information having a similarity to the face characteristic information of the user that is greater than or equal to a first threshold value and resulting from searching the stored reference information, certifying a person matching the searched reference face characteristic information as the same person as the user,
      in response to a plurality of pieces of the reference face characteristic information being searched, comparing the additional information of the user with reference additional information corresponding to the searched reference face characteristic information, and
      in response to reference additional information having a similarity to the additional information of the user that is greater than or equal to a second threshold value being found, certifying a person matching the searched reference face characteristic information as the same person as the user.

2. The method of claim 1, further comprising generating the learning system,
   wherein the generating the learning system comprises:

analyzing at least a preset number of reference images to detect face characteristic information and additional information of the reference images; and classifying and storing the face characteristic information and the additional information according to the detected characteristics.

3. The method of claim 2, further comprising:

if the user image is acquired when less than the preset number of reference images are registered, detecting characteristic information of the user image by using an initial learning system;

comparing the detected characteristic information with the stored reference information; and certifying the user based on a result of the comparing.

4. The method of claim 1, further comprising:

if the certifying of the user fails, performing re-photographing of the user; and re-certifying the user by using a re-photographed user image and the learning system.

5. The method of claim 4, wherein the performing of the re-photographing comprises:

outputting a guide message for guiding a preset reference photographing posture; and if the user is in the reference photographing posture, performing the re-photographing.

6. The method of claim 1, wherein the additional information comprises information about at least one of a hair style, a hair color, a clothes color, a clothes form, a beard, eyeglasses, piercings, and ear rings of the user.

7. A display apparatus comprising:

a storage configured to store a learning system generated based on at least a preset number of reference images, and characteristic information of a reference image analyzed by the learning system, the characteristic information being stored as reference information; and at least one processor configured to analyze a user image, acquired by photographing a user, using the learning system, detect face characteristic information and additional information of the user, and compare the face characteristic information of the user and the additional information of the user with the stored reference information to certify the user, the reference information comprising reference face characteristic information about the face of the user and reference additional information for identifying additional characteristics of the user other than the face of the user, wherein the at least one processor is further configured to certify the user based on a result of the comparing, wherein in response to reference face characteristic information having a similarity to the face characteristic information of the user that is greater than or equal to a first threshold value and resulting from searching the stored reference information, the at least one processor is further configured to certify a person matching the searched reference face characteristic information as the same person as the user, wherein in response to a plurality of pieces of the reference face characteristic information being searched, the at least one processor is further configured to compare the additional information of the user with reference additional information corresponding to the searched reference face characteristic information, and wherein in response to reference additional information having a similarity to the additional information of the user that is greater than or equal to a second threshold value being found, the at least one processor is further configured to certify a person matching the searched reference face characteristic information as the same person as the use.

8. The display apparatus of claim 7, wherein the at least one processor is further configured to analyze at least the preset number of reference images to detect face characteristic information and additional information of each of the reference images, classify the detected face characteristic information and the detected additional information according to the detected characteristics to generate the learning system, and store the generated learning system in the storage.

9. The display apparatus of claim 8, wherein if a new reference image is registered, the at least one processor is further configured to analyze the new reference image by using the learning system to detect characteristic information of the new reference image and additionally store the detected characteristic information in the storage as the reference information.

10. The display apparatus of claim 9, wherein the storage is further configured to additionally store an initial learning system, and wherein if the user image is acquired when at least the preset number of reference images are registered, the at least one processor is further configured to detect characteristic information of the user image using the initial learning system, and compare the detected characteristic information with the stored reference information to certify the user.

11. The display apparatus of claim 7, wherein if the certification of the user fails, the at least one processor is further configured to re-certify the user by using a re-photographed user image and the learning system.

12. The display apparatus of claim 11, further comprising a display configured to output a guide message for guiding a preset reference photographing posture, wherein if the user in the preset reference photographing posture, the at least one processor is further configured to control a camera to perform the re-photographing.

13. The display apparatus of claim 7, wherein the additional information comprises information about at least one of a hair style, a hair color, a clothes color, a clothes form, a beard, eyeglasses, piercings, and ear rings of the user.

14. A non-transitory computer-readable medium having recorded thereon a program, which, when executed by a processor, performs a method comprising:

analyzing a reference image using a learning system to detect characteristic information;

storing the detected characteristic information as reference information;

analyzing a user image, acquired by photographing a user, using the learning system to detect face characteristic information and additional information of the user;

comparing the detected face characteristic information of the user and the additional information of the user with the stored reference information, the reference information comprising reference face characteristic information about the face of the user and reference additional information for identifying additional characteristics of the user other than the face of the user; and certifying the user based on a result of the comparing, wherein the certifying the user comprises:

in response to reference face characteristic information having a similarity to the face characteristic information of the user that is greater than or equal to a first threshold value and resulting from searching the stored reference information, certifying a person matching the searched reference face characteristic information as the same person as the user, in response to a plurality of pieces of the reference face characteristic information being searched, comparing the additional information of the user with reference additional information corresponding to the searched reference face characteristic information, and in response to reference additional information having a similarity to the additional information of the user that is greater than or equal to a second threshold value being found, certifying a person matching the searched reference face characteristic information as the same person as the user.

15. The non-transitory computer-readable medium of claim 14, wherein the method further comprises generating the learning system, wherein the generating the learning system comprises:

analyzing at least a preset number of reference images to detect face characteristic information and additional information of the reference images;

classifying and storing the detected face characteristic information and the detected additional information.

16. The non-transitory computer-readable medium of claim 15, wherein the method further comprises:

detecting characteristic information of the user image by using an initial learning system, if the user image is acquired when less than the preset number of reference images have been analyzed;

comparing the detected characteristic information with the stored reference information; and certifying the user based on a result of the comparing.

17. The non-transitory computer-readable medium of claim 14, wherein the method further comprises:

re-acquiring the user image, if the certification of the user fails; and re-certifying the user by using the re-acquired user image.

* * * * *